United States Patent [19]

Murray

[11] Patent Number: 5,768,435
[45] Date of Patent: Jun. 16, 1998

[54] METHOD AND SYSTEM FOR TRANSFERRING A BIT-MAPPED IMAGE USING VERTICAL AND HORIZONTAL RULES

[75] Inventor: Ronald C. Murray, Redmond, Wash.

[73] Assignee: Microsoft Corporation, Redmond, Wash.

[21] Appl. No.: 220,456

[22] Filed: Mar. 31, 1994

Related U.S. Application Data

[63] Continuation of Ser. No. 872,188, Apr. 22, 1992, abandoned.

[51] Int. Cl.$^6$ ............................................. G06K 9/36
[52] U.S. Cl. ...................... 382/243; 382/317; 358/432
[58] Field of Search ........................... 382/1, 16, 22, 382/24, 25, 27, 56, 61, 241, 243, 317; 395/141; 358/433, 432

[56] References Cited

U.S. PATENT DOCUMENTS

| | | | |
|---|---|---|---|
| 3,597,732 | 8/1971 | Morimoto | 382/22 |
| 3,613,081 | 10/1971 | Morimoto | 382/22 |
| 4,130,819 | 12/1978 | Engelmann | 382/22 |
| 4,375,654 | 3/1983 | Evans et al. | 382/25 |
| 4,410,916 | 10/1983 | Pratt et al. | 358/263 |
| 5,077,809 | 12/1991 | Ghazizadeh | 382/33 |
| 5,113,457 | 5/1992 | Enomoto et al. | 382/243 |
| 5,191,612 | 3/1993 | Katsuyama et al. | 382/9 |

*Primary Examiner*—Leo Boudreau
*Assistant Examiner*—Christopher S. Kelley
*Attorney, Agent, or Firm*—Seed and Berry LLP

[57] ABSTRACT

Methods of recognizing rules, solid lines or rectangles, in a bit-mapped image and of using those rules to enable a suitable printer or other suitable device to receive the bit-mapped image quickly. In a preferred embodiment, the methods include the steps of recognizing rules, forming rule descriptors for the rules, and then transmitting the rule descriptors to the receiving device. Vertical rules are recognized by partitioning the bit-mapped image into a plurality of adjacent horizontal stripes of row data, dividing that horizontal stripe into data columns formed from vertically aligned row data bits, and ANDing the data bits in each vertically aligned column to identify, by a HIGH output from the AND function, vertical lines which span the horizontal stripe. Adjacent or continuous vertical lines are then identified. Horizontal rules are identified by dividing the row data into bytes, ANDing individual bits of each byte together, and recognizing a horizontal line by a HIGH output from the AND function. Adjacent horizontal lines are identified and combined. Horizontal rule descriptors are then formed and sent to the printer or other receiving device.

21 Claims, 4 Drawing Sheets

| | Columns | | | | | | | |
|---|---|---|---|---|---|---|---|---|
| | 1C | 2C | 3C | 4C | 5C | 6C | 7C | 8C |
| 25R | 0 | 0 | 1 | 1 | 0 | 1 | 1 | 0 |
| 26R | 0 | 0 | 1 | 1 | 1 | 1 | 0 | 0 |
| 27R | 0 | 0 | 1 | 1 | 1 | 1 | 0 | 1 |
| 28R | 0 | 0 | 1 | 1 | 1 | 1 | 0 | 1 |
| 29R | 0 | 0 | 1 | 1 | 1 | 1 | 0 | 1 |
| 30R | 0 | 0 | 1 | 1 | 1 | 1 | 0 | 1 |
| 31R | 0 | 0 | 1 | 1 | 1 | 1 | 0 | 1 |
| 32R | 0 | 0 | 1 | 1 | 1 | 0 | 0 | 0 |
| | 0 | 0 | 1 | 1 | 0 | 0 | 0 | 0 |

Rows — 148, 148'

METHOD AND SYSTEM FOR TRANSFERRING A BIT-MAPPED IMAGE USING VERTICAL AND HORIZONTAL RULES

CROSS-REFERENCE TO RELATED APPLICATION

This application is a continuation of U.S. patent application Ser. No. 07/872,188, filed Apr. 22, 1992, now abandoned.

TECHNICAL FIELD

This invention generally relates to the transfer of bit-mapped images. More particularly, it relates to methods for recognizing and using vertical and horizontal rules to reduce the amount of data required to transfer a bit-mapped image from a first device, such as a computer, to another device that is capable of using rules, such as some printers.

BACKGROUND OF THE INVENTION

Frequently it becomes necessary to transfer digital values which comprise a bit-mapped image from a sending device, such as a computer, to a receiving device, such as a printer. Each of the digital values corresponds to an image point, hereinafter called a pel (picture element). An 8×10 inch bit-mapped image reproduced on a printer having a resolution of 300 pels per inch (ppi) can be described by 7,200,000 pels. In the simplest case wherein the pels are restricted to either black or white, an 8×10 inch bit-mapped image could be represented by 900,000 8-bit bytes. As is well known, color images require a larger number of bytes.

In the typical application wherein a bit-mapped image to be printed is stored in a computer's memory, the image must be sent to the printer. The interconnection of the computer to the printer is by either a serial or a parallel port connection. Serial connections typically can transfer data at a rate of about 1,928 bytes per second, while parallel connections are usually five to ten times faster. Ignoring any overhead required in the printer's command language, and assuming that the bit-mapped image is sent as a stream of byte values, a typical serial computer-to-printer interface might require 470 seconds to transfer a monochrome bit-mapped image. Even using a fast parallel interface, about 47 seconds might be required. Since many printers can print a page within about ten seconds after receipt of the complete bit-mapped image, the time required to transfer the data between the computer and the printer is a serious bottle neck. Therefore, methods of reducing the amount of data required to transfer a bit-mapped image are highly desirable.

Many printers provide features which can be exploited to speed up the transfer of bit-mapped images. For example, some printers can print solid lines or rectangles, hereinafter called rules, when they are provided with rule descriptors, such as the coordinates of diagonally opposing corners of the rule or the coordinates of one corner plus the height and width of the rule. A vertical rule is defined herein as a vertical line or a tall rectangle while a horizontal rule is defined as a horizontal line or a wide rectangle. Vertical and horizontal rectangle overlap in definition, and a single rectangle may alternatively be considered as a vertical or a horizontal rule.

Using rules can significantly reduce the amount of data which must be transferred from the sending device to the receiving device. For example, consider a ten inch vertical line one pixel wide. Describing that line as a vertical rule is trivial, all that must be done is to (1) specify that a vertical rule is being sent and (2) provide a suitable printer with the coordinates of the beginning and the ending points of the rule. In contrast, sending individual data bits would require at least 3,000 bytes when using a printer printing at 300 pels per inch. In practical applications, many more bytes are required since all printers require additional information, referred to as command overhead, to operate. For example, the Hewlett-Packard LaserJet II must receive 4 command overhead bytes for each new raster line. Therefore, 15,000 bytes would have to be transmitted from the computer to the printer to describe a single ten-inch line printed at 300 pels per inch. While not as dramatic, the use of horizontal rules can also significantly reduce the amount of information that must be transferred. Therefore, it would be highly useful to be able to recognize vertical and horizontal rules in a bit-mapped image and to use that information to reduce the amount of data which must be transferred from the sending device to the receiving device by using rules.

SUMMARY OF THE INVENTION

It is an object of the present invention to provide a method of recognizing vertical rules in a bit-mapped image.

It is another object of the present invention to provide a method of recognizing horizontal rules in a bit-mapped image.

Yet another object of the present invention is to provide a method of reducing the amount of data required to describe a bit-mapped image.

It is another object of the present invention to provide a method of reducing the time required to print a bit-mapped image stored in a computer.

These and other objects of the present invention, which will become obvious to those skilled in the art as preferred embodiments of the invention are described more thoroughly below, are provided by methods of and systems for recognizing rules in a bit-mapped image and of using those rules to enable a suitable printer, or other such receiving device, to receive the bit-mapped image quickly. Preferred embodiments include the steps of recognizing rules in a bit-mapped image, forming rule descriptors for those rules, and then transmitting the rule descriptors to a receiving device. Preferably, vertical rules are recognized by partitioning the bit-mapped image into a plurality of adjacent horizontal stripes, each stripe comprised of a number of rows of image data. The image data of each horizontal stripe is then partitioned into vertical data columns formed from vertically aligned data bits in each of the rows comprising the horizontal stripe. Vertical lines are recognized by AND-ing the data bits in each vertical data column to identify, by a HIGH output from the AND function, vertical lines which span the horizontal stripe. Rule descriptors for the vertical lines are then formed. Adjacent and continuous vertical lines are combined and identified using a single descriptor. A rule descriptor is a set of digital values useable by the receiving device to define the rule. Typically, a rule descriptor contains either the coordinates of diagonally opposite corners of the rule, or the coordinates of one corner plus the height and width of the rule. Preferably, the height of a vertical rule is determined by identifying the adjacent horizontal stripes through which the rule passes and then noting the top row of the first horizontal stripe and the last row of the last horizontal stripe through which the vertical rule passes. The width is preferably determined by identifying the first and last columns which contain the vertical rule.

Preferably, horizontal rules are recognized by partitioning individual rows of the bit-mapped image data into a plurality of 8-bit bytes. The occurrence of a horizontal line is determined by ANDing together the individual bits comprising each byte. If a HIGH output results from the AND function, a horizontal line is identified. Adjacent horizontal lines are identified by determining similar dimensioned horizontal lines in adjacent rows.

DETAILED DESCRIPTION OF THE PREFERRED EMBODIMENT

The present inventive methods reduce the amount of data needed to transfer a bit-mapped image from one device, such as a computer, to another device capable of using rules, such as some printers. In the preferred embodiments described herein, the methods involve identifying vertical and horizontal rules, solid lines or rectangles within the bit-mapped image and forming rule descriptors of the rules for transmittal to a receiving device.

Figure 1:
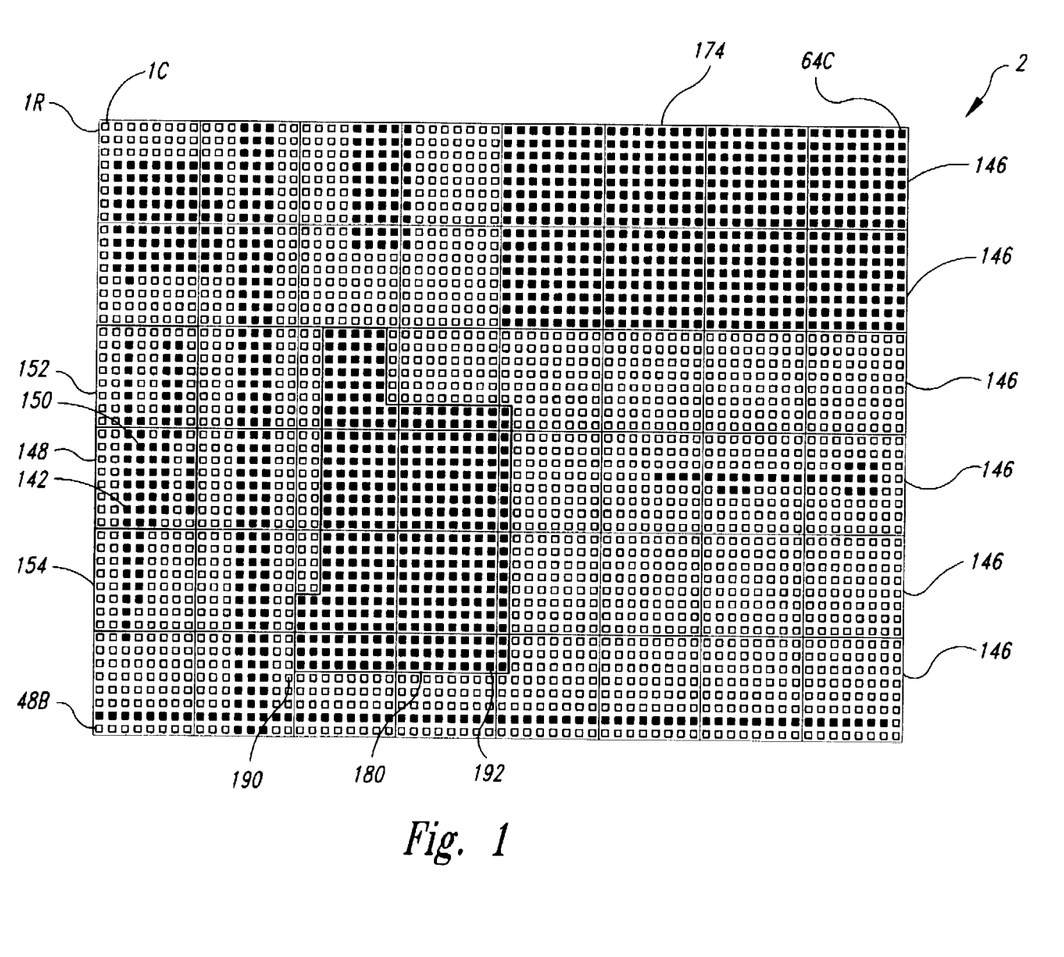
FIG. 1 illustrates a typical bit-mapped image containing vertical and horizontal rules and its characterization in accordance with preferred embodiments of the present invention.

The descriptions of the inventive methods are assisted by relating a bit-mapped image to an X-Y coordinate system. Each image point of the bit-mapped image, or its equivalent data value, has a particular location within the bit-mapped image which is identifiable with a specific row and column. This is illustrated in FIG. 1 wherein a bit-mapped image 2 comprised of black and white picture elements, hereinafter called pels, is shown. Each black pel will be assumed to be represented by a digital HIGH, and each white pel will be assumed to be represented by a digital LOW. FIG. 1 shows a bit-mapped image comprised of 48 rows, identified by the numbers 1R-48R starting at the top and counting down, and 64 columns numbered 1C-64C, starting at the far left and counting to the right. In practice a complete bit-mapped image may consist of thousands of individual rows and columns. Because of the correspondence between the digital values and the pels, the term "bit-mapped image" interchangeably describes the set of digital values corresponding to the pels and the set of pels corresponding to the digital values.

The pels are beneficially organized into array sets called row vectors, one row vector for each row. The row vector entries are the digital values of the pels in each row. The row vectors are numbered the same as the rows 1-48 and correspond to rows 1R-48R, respectively, from which they are formed. With reference to FIG. 1, the row vector 48 has vector entries that are sequential LOWs, except for entries 12, 13, and 14, which correspond to the pels in columns 12C, 13C, and 14C, respectively, which are HIGH. Likewise, the row vector 47 is comprised of 63 consecutive HIGH entries followed by a single LOW in entry 64. Because the row vector entries align column-wise with row vector entries in other rows, column vectors can be formed from the row vector entries. For example, a column vector 1, which corresponds to column 1C, could be formed using 46 sequential LOW entries followed by a HIGH in entry 47, followed by another LOW in entry 48. The use of column and row vectors both parallels the operation of the preferred embodiment apparatus and significantly reduces the complexity in describing and understanding the inventive methods.

Figure 2:
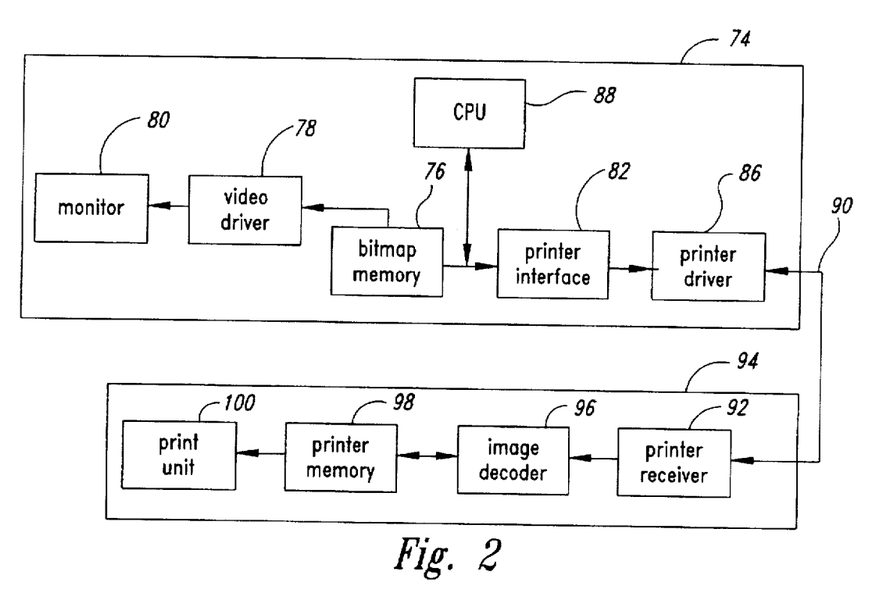
FIG. 2 shows the preferred embodiment apparatus for practicing the inventive methods.

The preferred apparatus for implementing the inventive methods is illustrated in FIG. 2, a simplified block diagram of a computer/printer network 72. A computer 74 includes a bit-mapped memory 76 which stores a bit-mapped image comprised of digital values. The bit-mapped image may have been created by application software, a digitizer, or may be from another device. The bit-mapped image may be applied to a video driver 78 which causes the image to be displayed on a monitor 80 for viewing by an operator. The bit-mapped image may also be applied to a printer interface 82 which creates a copy of the bit-mapped image and which processes the image data by: (1) identifying rules within the bit-mapped image; (2) creating and storing rule descriptors, and; (3) transferring those rule descriptors to a printer driver 86. Preferably, the printer interface also removes the image data corresponding to the rule descriptors from the copy of the bit-mapped image and thus only the residue data, i.e., that portion not within the rules, remains in the copy. After all rules have been identified and stored, the printer interface transfers the rule descriptors and the residue data to the printer driver 86. The operation of the computer 74 is controlled by a central processing unit 88 under the control of a software program (not shown).

All data applied to the printer driver 86 is sent via an interface bus 90 to a printer receiver 92 in a printer 94. The printer 94 must be of the type capable of using rule descriptors, such as the HP Laserjet series of printers. The printer receiver 92 receives the rule descriptors and the residue data and applies them to an image decoder 96. The image decoder 96 regenerates the original bit-mapped image by combining the bit-mapped image data described by the rule descriptors with the residue data. The regenerated bit-mapped image is then stored in a printer memory 98. When the bit-mapped image is to be printed, the printer memory 98 sends it to a print unit 100 which then prints the image.

Referring again to FIG. 1, the identification of vertical rules, such as the vertical line 142, is assisted by partitioning the bit-mapped image into a set of adjacent horizontal stripes 146; each horizontal stripe being comprised of a number of adjacent rows. For subsequent use when creating rule descriptors, the first and last row numbers of each horizontal stripe are stored in a Row Number Array. While FIG. 1 shows each horizontal stripe 146 as comprised of 8 rows of 64 pels each, frequently a bit-mapped image will have rows thousands of pels long. To recognize a vertical line traversing a horizontal stripe, column vectors are formed from the individual row vector entries of each horizontal stripe. The entries of these column vectors are ANDed together; if the AND function outputs a HIGH, a vertical line is known to traverse the horizontal stripe. An understanding of this process is assisted by reference to FIG. 3, which shows a tabular listing of the digital values of a block 148 of FIG. 1. For the column vectors 1C and 2C, the AND function produces a LOW output. However, for the column vectors 3C and 4C, the AND function produces a HIGH output, indicating that vertical lines 142 and 150 of FIG. 1 traverses block 148. The AND operations performed on the other column vectors all result in a LOW output. As shown in FIG.

Figure 3:
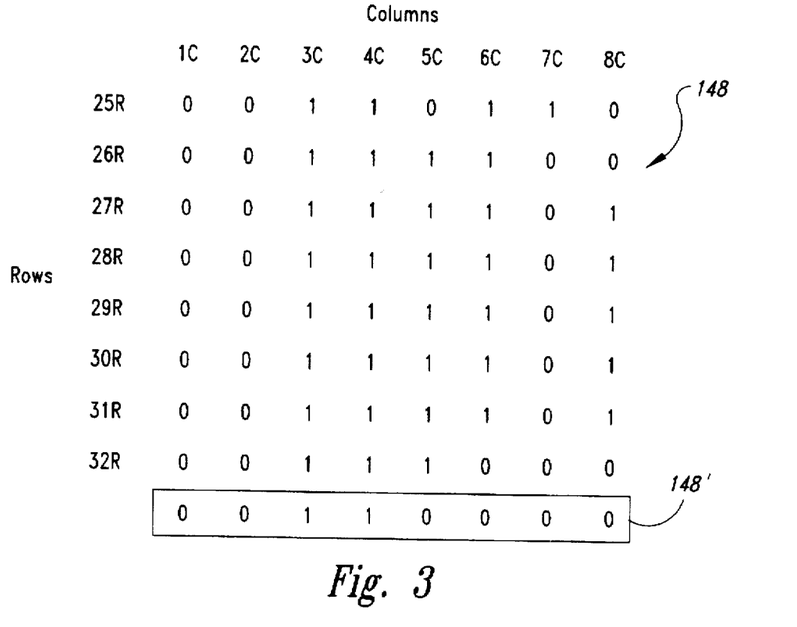
FIG. 3 is a tabular listing of part of a horizontal stripe which contains a vertical rule.
Figure 4:
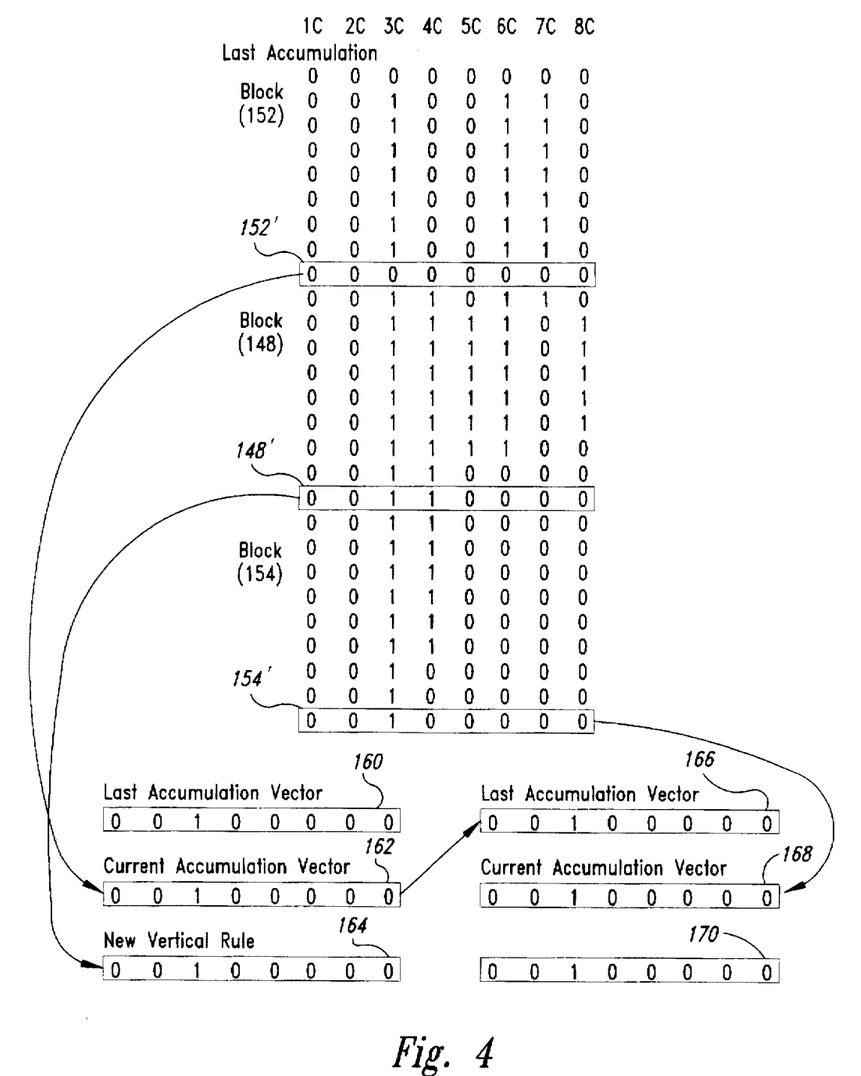
FIG. 4 is a tabular listing of several row and column vectors of digital data in several horizontal stripes.

3. the results of the AND function are used to form accumulation vectors, such as accumulation vector 148' shown in FIG. 4. Each accumulation vector entry corresponds to the AND result for a column vector through a horizontal stripe, i.e., the fifth entry of an accumulation vector is the AND result of the fifth column, 5C. By scanning the entries of an accumulation vector, it can readily be determined in what column vertical lines traverse the horizontal stripe. Since each horizontal stripe produces its own accumulation vector, and since each HIGH entry in an accumulation vector corresponds to a vertical line, the presence of vertical lines which pass through adjacent horizontal stripes is easily found by ANDing accumulation vector entries. This process is described in more detail below.

If short vertical lines are to be detected, the horizontal stripes could be made only a few rows wide. However, if the horizontal stripes are made too narrow, the time required to search for the vertical rules, plus the time required to create the rule descriptors and to transfer them to the printer, is more than the time required to send each pel individually. Therefore, the height of the horizontal stripes is preferably selected to maximize the benefit of recognizing and using vertical rules. While the optimum horizontal stripe height may vary from application to application and from printer to printer, a horizontal stripe of thirty four rows has been found to produce good results for general use. It can be seen that the amount of data required to describe the vertical line 142 of FIG. 1 could be minimized by using the actual starting and stopping row numbers, 18R and 41R, without reference to the horizontal stripes. In preferred embodiments, the disadvantage of not using the actual starting and stopping locations is overcome by the simplicity and efficiency of generating vertical rule descriptions dependent upon the horizontal stripes. In the preferred embodiment, portions of the bit-mapped image not contained in the rules are sent bit-by-bit to the printer.

The efficiency of recognizing and using vertical rules is further enhanced in the preferred embodiment described herein by recognizing vertical lines which span more than one horizontal stripe, such as does vertical line 142 of FIG. 1. An understanding of a preferred method of recognizing vertical lines traversing more than one horizontal stripe is assisted by FIG. 4, which provides a tabular listing of the digital values of blocks 148, 152, and 154 of FIG. 1, together with their respective accumulation vectors 148', 152', and 154'. As shown in FIG. 1, the vertical line 142 traverses both blocks 148 and 154 while the vertical line 150 traverses only block 148. Additionally, no vertical line traverses block 152. Referring now to FIG. 4, the AND function applied to block 152 results in an accumulation vector 152' having entries of all zeros. Prior to the determination of the accumulation vector 148', the accumulation vector 152' is stored as a Last_Accumulation vector 160. When the accumulation vector 148' is determined, it is readily seen from the HIGH entries that the two vertical lines, 142 and 150, do traverse the block 148. To detect this, the accumulation vector 148' is stored as a Current_Accumulation vector 162. Any HIGH entry in the Current_Accumulation vector indicates that a vertical line traverses the horizontal stripe from which the Current_Accumulation vector was developed. The Current_Accumulation and Last_Accumulation vectors are used to generate signals that indicate that a new vertical line has begun. With reference to FIG. 4, a New_Vertical_Rule vector 164 is formed from the Current_Accumulation vector 162 and the Last_Accumulation vector 160 as follows:

New_Vertical_Rule=Not (Last_Accumulation))AND Current Accumulation

Any resulting HIGH in the New_Vertical_Rule vector 164 denotes the beginning of a New_Vertical_Rule at the column corresponding to the HIGH. The HIGH New_Vertical_Rule entries cause a Rule Descriptor array to store the top row number, available from the Row Number Array, of the currently processed horizontal stripe at the corresponding column addresses.

The prior Current_Accumulation vector 162 is then stored as the Last_Accumulation vector 166 and the next horizontal stripe is processed to form the accumulation vector 154', which is then stored as the Current_Accumulation vector 168.

As shown by the HIGHs in FIG. 4, column 3C, the vertical line 142 (see FIG. 1) traverses block 154 while the vertical line 150 (see FIG. 1) in column 4C terminates. To detect that a vertical line has ended within the block 154, the contents of the Last_Accumulation vector 166 is ANDed, with the inverse of the Current_Accumulation vector 168 to produce an End_Accumulation vector 170. Any HIGH in the End_Accumulation vector 170 designates that a vertical line has ended in the current horizontal stripe. This causes the number of the bottom row of the horizontal stripe used to derive the Last_Accumulation vector, available from the Row Number Array, to be stored as the ending row number in the Rule Descriptor array at the corresponding column addresses.

With the starting and ending row numbers stored in the Rule Descriptor Array at the column addresses corresponding to columns containing rule descriptors at vertical lines, rule descriptors can be constructed for transmittal to the printer. The actual form of the rule descriptors depends upon the particular printer being used and consequently reference to the specifications of the specific printer being used is required. However, for purposes of further explanation, it will be assumed that the rule descriptors consist of a starting position, comprised of a row number and column number, followed by the height of the rule, followed by the width of the rule. A width of 1 designates a vertical line.

By using accumulation vectors, it is easy to check for adjacent vertical lines by using a method best understood with reference again to FIG. 3. By ANDing pairs of adjacent entries of the accumulation vector 148' together, the adjacent HIGHs in columns 3C and 4C, are easily found. Instead of using two separate rule descriptors, one for each vertical line, the width entry of the first rule descriptor, that for the vertical line in column 3C, is preferably increased by one (1). Thus, by detecting adjacent ones in the accumulation vectors, and by incrementing the width of the first ruled descriptor found, adjacent vertical lines in a horizontal stripe can be described using a single rule descriptor.

The above procedures of recognizing vertical lines which traverse more than one adjacent horizontal stripe and for detecting adjacent vertical lines within each horizontal stripe are preferably combined to provide a rule descriptor which describes adjacent vertical lines which traverse more than one horizontal stripe. Width-wise, in the preferred embodiment this is done by searching the Last_Accumulation vector for adjacent HIGH entries. Since the Last_Accumulation vector has HIGH entries for vertical rules which traverse the horizontal stripe above the one currently being processed, adjacent HIGH entries denote a vertical rule which spans more than one column in that horizontal stripe. By comparing the Last_Accumulation vector with the Current_Accumulation vector it is determined when changes occur in the vertical rule. If a vertical rule traverses adjacent horizontal stripes, the rule descriptor for the vertical rule in the Last_Accumulation vector has its height entry incremented. By incrementing both heights and widths, a solid black block, such as block 174 of FIG. 1, can be sent as a single rule descriptor by identifying the upper left corner, row 1R, column 33C, plus a height of 16, plus a width of 32. A non-rectangular piece of the bit-mapped image preferably is sent to the receiving device by using rule descriptors for rectangular sections. Referring again to FIG. 1, the majority of the solid black section 180 could be described using two rule descriptors:

rule descriptor 1=Row 17R, column 19C+24 (height)+5 (width)

rule descriptor 2=Row 25R, column 25C+16 (height)+9 (width)

Some portions of the section 180, residue data, are not found by the preferred embodiment vertical rule search because they are pieces which do not span a horizontal stripe. Some of these portions are found during a search for horizontal rules.

A horizontal rule, a horizontal line or rectangular, may be as small as a single horizontal line of pels or may completely cover the image. A single horizontal line of pels spanning a ten-inch wide landscape image printed on a printer capable of printing 300 dots per inch would require at least 375 bytes to transfer byte-by-byte. However, as discussed with reference to the vertical rules, printers require additional data as part of their printer command overhead. As with vertical rules, the amount of data required to transfer a horizontal rule can be substantially reduced by exploiting the rule descriptor capabilities of some printers.

An understanding of a preferred method of recognizing a horizontal line is assisted by FIG. 1, specifically the horizontal line in row 47R. That horizontal line is preferably recognized by dividing row vector 47, into adjacent sequences of 8-bit bytes, and then ANDing the digital values of each byte together. If the AND function produces a HIGH, a horizontal line at least one byte long is found. While the partitioning of the row vector into groups shorter than a byte would result in shorter lines being found, the advantages of using rule descriptors could be lost since it might be quicker to send short lines byte-by-byte than to search for and use rule descriptors. A rule descriptor could be formed using the row number and the starting and ending column numbers for each byte that produces a HIGH from the AND function. Provided that the amount of data required to signal the printer that a rule descriptor follows and to send the rule descriptor to the printer is less than the amount of data required to transmit the horizontal line byte-by-byte, a reduction in the amount of data required to be transferred is achieved.

However, in the preferred embodiment described herein, the use of horizontal rules is further enhanced by recognizing adjacent horizontal lines in the same row and adjacent rows which contain similar horizontal lines. Assuming again that rule descriptors are comprised of the row and column numbers of the upper left hand pel, plus the width, plus the height of the rule, adjacent rows containing similar horizontal lines can be described using only one descriptor. For example, referring again to FIG. 1, part of the residue of block 180 can be described as a rule beginning in row 41R, column 17C, 16 columns wide and three rows high, thereby defining the horizontal rectangle having diagonal corners 190 and 192.

Determining a horizontal line which spans more than one byte is readily accomplished. By applying the entries of the row vector to the ANDing function a byte at a time, the first HIGH from the AND function designates the start of a horizontal line and the far left column number, along with the row vector number, is stored in the Rule Descriptor array. The next byte of the row vector which does not produce a HIGH from the AND function causes the far right column number of the previous byte to be stored as the ending column of the horizontal line. Subsequent bytes which produce a HIGH from the AND function of the row vector will also cause entries in the Rule Descriptor array.

Figure 5:
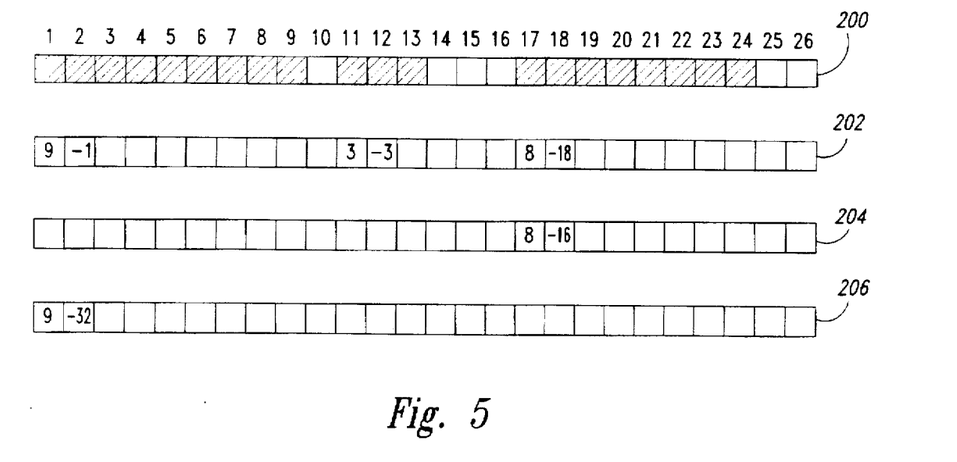
FIG. 5 is an illustration of the relationship between a row vector and the various run table vectors of the preferred embodiment.

While finding byte-long horizontal lines in a row is a simple process, the recognition of horizontal rules which span several adjacent rows is more involved. According to the preferred embodiment described herein, the identification of such horizontal rules involves 6 arrays: the Rule Descriptor array previously described; 3 run table vectors; and 2 rule descriptor address vectors. The first run table vector, called the RunTable[N] vector, contains a description of all horizontal lines in the row vector being searched that traverse a byte. Specifically, the descriptions in the RunTable[N] vector include the number of sequential bytes which produces HIGHs from the AND function information, which is stored at the address corresponding to the first column of the first byte which produces a HIGH, and, at the next address location, the negative inverse of the number of bytes between bytes which output HIGHs. This is better understood with reference to FIG. 5, wherein a row vector 200 is shown with a RunTable[N] vector 202 and two other run table vectors which are described below. Row vector 200 produces HIGHs in bytes corresponding to locations 1-9, 11-13, and 17-24. To designate the number of sequential bytes which produce HIGHs, the RunTable[N] vector 202 has entries of 8 in address 1, 3 in address 11, and 8 in address 17. To designate the space between sequential HIGH runs, the Run Table[N] vector 202 has a −1 at address 2, a −3 at address 12, and a −8 at address 18. It is assumed that the row vector 200 of FIG. 5 is being compared with an adjacent row vector 199 (not shown). Another run table vector, called the RunTableLast vector 204, contains a similar description of the row vector 99 as that in the RunTable [N] vector 202. Finally, another run table vector, called the RunTableVertical vector 206 contains a similar description of the accumulation vector of the horizontal stripe containing the row vector 200.

By comparing the entries of the RunTable[N] vector with the corresponding entries of the RunTableLast and RunTableVertical vectors it is readily determinable whether a new horizontal rule is in the row vector 200. For example, with reference to FIG. 5, the address 1 entries of the RunTable[N] vector 202 and the RunTableVertical vector 206 are the same. Therefore, it is known that the horizontal line in the row vector 200 is a part of a vertical rule. Because, in the preferred embodiment, rule descriptors are formed for vertical rules before horizontal rules, and because it is known that a vertical rule descriptor already exists which describes the horizontal line, no further action need be taken.

If, however, the RunTableVertical vector 206 does not have an entry at an address, but the RunTable[N] vector does, the RunTable[N] vector is compared with the RunTableLast vector 204. For example, referring to FIG. 5, in column 17C the RunTable[N] vector 202 and the RunTableLast vector 204 have identical entries. This indicates two adjacent similar horizontal rules in row vectors 199 and 200. Since the horizontal rules share the same starting column and extend for the same length, only one rule descriptor is needed. This rule descriptor is obtained by incrementing the rule descriptor for the rule in the higher row, that corresponding to the RunTableLast vector 204, by one(1).

If, however, the RunTableVertical vector 206 and the RunTableLast vector 202 do not contain entries where the RunTable [N] vector 204 does contain an entry, it is known that a new horizontal rule in the form of a line exists in the row vector 200. For example, address 11 of RunTable [N] vector 202 contains an entry 3 which indicates that the row vector 200 has a horizontal line which is at least 24 columns long.

The process of incrementing the height of an existing rule descriptor upon the occurrence of a similar horizontal line in an adjacent row may be extended to describe many adjacent similar horizontal lines. To assist in finding the number of similar horizontal lines in adjacent rows, the preferred embodiment described herein uses two additional vectors: P_Rule_Last and P_Rule_Current. The entries of P_Rule_Last are the addresses of the horizontal rule descriptors found prior to the search of the current row. When a horizontal line in the current row is found, the contents of the P_Rule_Last vector at the address of the first column of the horizontal line is checked. If the P_Rule_Last vector contains an address at that location, and if the rule at that address is similar to the horizontal line found, the contents of the height entry of the rule at the stored address is incremented by 1 and a copy of that address is stored into P_Rule_Current. However, if the horizontal rule is not a continuation from the previous row, i.e., it not similar to the horizontal line previously found or is new, a rule descriptor for the new horizontal line is created and the address of that rule is stored within P_Rule_Current. Upon the completion of the search of the current row, P_Rule_Current contains the addresses of all of the horizontal rules within the currently scanned row. Prior to the search of the next row, the RunTable[N] vector is copied into the RunTableLast vector and the P_Rule_Current is copied into the P_Rule_Last vector. After theses swaps, the entries of the vectors RunTable[N] and P_Rule_Current are all set to zero, and horizontal rules are searched for in the next row.

After all of the vertical and horizontal rules have been found and their rule descriptors are created, the rule descriptors in the rule descriptor array are sent to the receiving device. The particular form of transmittal may vary. In the preferred embodiment described herein a text string of the rule descriptors is composed. After receipt of the text string, the receiving device preferable recomposes into its memory the portions of the bit-mapped image described by the rule descriptors.

It should be noted that some parts of the bit-mapped image are not described by the rule descriptors. Depending upon the applications, this residue is either ignored or sent by other techniques, such as bit-by-bit. To assist in the process, the portions of the bit-mapped image described by the rule descriptors are preferably removed from the bit-mapped image. This entails zeroing all HIGH pel values described by the rule descriptors. The residue can then be sent to the receiving device, bit-by-bit, and then be added to the portions sent via the rule descriptors to recreate the original bit-mapped image.

It is to be understood that even though numerous characteristics and advantages of the present invention have been set forth in the foregoing, together with details of the structure and function of the invention, the above disclosure is illustrative only. Changes may be made in details and yet remain within the principles of the invention, which are defined by the appended claims.

I claim:

1. A method in a computer system for transferring a bit-mapped image to a receiving device that recognizes rule descriptors representing rules and recreates the rules based on the rule descriptors, each rule including a rectangular area of identical image elements and having a position, a height defined by a number of rows of identical image elements, and a width defined by a number of columns of identical image elements, each rule descriptor including indications of the position, height, and width of the rule represented by the rule descriptor, the method comprising:

scanning the bit-mapped image to identify rectangular areas of like image elements in the bit-mapped image;

for each rectangular area identified, representing the rectangular area as a rule with a rule descriptor that includes indications of the position, length, and width of the rectangular area in the bit-mapped image;

for each portion of the bit-mapped image not represented as a rule, transferring bit-by-bit the image elements of the portion to the receiving device;

for each rectangular area represented as a rule, transferring to the receiving device the rule descriptor for the rule representing the rectangular area; and re-creating the bit-mapped image at the receiving device by displaying the rectangular areas represented by rules in response to receiving the rule descriptors and displaying the portions not represented by rules in response to receiving the image elements of those portions.

2. The method of claim 1 wherein the scanning step includes:

partitioning the bit-mapped image into a plurality of horizontal stripes, each horizontal stripe being comprised of a plurality of rows of image elements;

creating data columns through said horizontal stripe, each data column comprised of vertically aligned image elements within said rows of image elements comprising said horizontal stripe;

ANDing the image elements in a selected one of said data columns with each other; and identifying said rectangular area based upon the outcome of said ANDing step.

3. The method of claim 1 wherein the bit-mapped image is organized into a plurality of rows of image elements and the scanning step includes:

partitioning each of the rows into a plurality of row data sections, each row data section comprised of a predetermined plural number of image elements;

ANDing the image elements within one of the row data sections with each other;

repeating the ANDing step for each of said row data sections; and recognizing the rectangular area based upon the outcome of the ANDing steps.

4. A computer storage medium including executable instructions for causing a computer to transfer a bit-mapped image to a receiving device that recognizes rule descriptors representing rules and re-creates the rules based on the rule descriptors, each rule including a rectangular area of identical image elements and having a position, a height defined by a number of rows of identical image elements, and a width defined by a number of columns of identical image elements, each rule descriptor including indications of the position, height, and width of the rule represented by the rule descriptor, the computer instructions causing the computer to:

scan the bit-mapped image to identify rectangular areas of like image elements in the bit-mapped image;

for each rectangular area identified, represent the rectangular area as a rule with a rule descriptor that includes indications of the position, length, and width of the rectangular area in the bit-mapped image;

for each portion of the bit-mapped image not represented as a rule, transfer bit-by-bit the image elements of the portion to the receiving device; and for each rectangular area represented as a rule, transfer to the receiving device the rule descriptor for the rule representing the rectangular area, whereby the receiving device re-creates the bit-mapped image by displaying the rectangular areas represented by rules in response to receiving the rule descriptors and displaying the portions not represented by rules in response to receiving the image elements of those portions.

5. The computer storage medium of claim 4 wherein computer instructions for scanning the bit-mapped image include computer instructions for causing the computer to:

partition the bit-mapped image into a plurality of horizontal stripes, each horizontal stripe being comprised of a plurality of rows of image elements;

create data columns through said horizontal stripe, each data column comprised of vertically aligned image elements within said rows of image elements comprising said horizontal stripe;

AND the image elements in a selected one of said data columns with each other; and identify said rectangular area based upon the outcome of said ANDing step.

6. The computer storage medium of claim 4 wherein computer instructions for scanning the bit-mapped image include computer instructions for causing the computer to:

partition each of the rows into a plurality of row data sections, each row data section comprised of a predetermined plural number of image elements;

AND the image elements within one of the row data sections with each other;

repeat the ANDing step for each of said row data sections; and identify the rectangular area based upon the outcome of the ANDing steps.

7. A method in a computer system for encoding a bit-mapped image, the image having image elements, each image element having a value and a location within the image, the method comprising:

identifying rectangular areas of the image in which each image element of each identified rectangular area contains the same value, each identified rectangular area having a height and a width indicating a number of image elements vertically and horizontally in the rectangular area and having a location indicating the locations of the image elements;

for each identified rectangular area, storing the location, width, and height of the rectangular area; and for each image element that is not in one of the identified rectangular areas, storing the value of the image element;

wherein the stored encoded bit-mapped image comprises the location, width, and height of each identified rectangular area and the value of each image element that is not in one of the identified rectangular areas.

8. The method of claim 7 wherein the identifying step includes:

partitioning the bit-mapped image into a plurality of horizontal stripes, each horizontal stripe being comprised of a plurality of rows of image elements;

creating data columns through said horizontal stripe, each data column comprised of vertically aligned image elements within said rows of image elements comprising said horizontal stripe;

ANDing the image elements in a selected one of said data columns with each other; and identifying said rectangular area based upon the outcome of said ANDing step.

9. The method of claim 7 wherein the bit-mapped image is organized into a plurality of rows of image elements and the identifying step includes:

partitioning each of the rows into a plurality of row data sections, each row data section comprised of a predetermined plural number of image elements;

ANDing the image elements within one of the row data sections with each other;

repeating the ANDing step for each of said row data sections; and recognizing the rectangular area based upon the outcome of the ANDing steps.

10. The method of claim 7, further comprising:

transmitting the location, width, and height of each rectangular area to a receiving device;

transmitting the value of each image element that is not in one of the identified rectangular areas; and recreating the bit-mapped image at the receiving device.

11. The method of claim 10 wherein the receiving device is a printer.

12. The method of claim 7 wherein the step of storing the location, width, and height of each identified rectangular area includes, for each identified rectangular area, storing location coordinates of image elements at two opposite corners of the rectangular area.

13. The method of claim 7 wherein the step of storing the location, width, and height of each identified rectangular area includes, for each identified rectangular area, storing a height value, a width value, and location coordinates for an image element of the rectangular area.

14. The method of claim 7 wherein the identifying step includes identifying a rectangular area only if the rectangular area has plural image elements vertically and plural image elements horizontally.

15. The method of claim 1 wherein the receiving device is a printer.

16. The method of claim 1 wherein the step of representing each identified rectangular area as a rule with a rule descriptor includes, for each identified rectangular area, representing the rectangular area with location coordinates of image elements at two opposite corners of the rectangular area.

17. The method of claim 1 wherein the step of representing each identified rectangular area as a rule with a rule descriptor includes, for each identified rectangular area, representing the rectangular area with a height value, a width value, and location coordinates for an image element of the rectangular area.

18. The method of claim 1 wherein the scanning step includes identifying a rectangular area only if the rectangular area has plural image elements vertically and plural image elements horizontally.

19. The computer storage medium of claim 4 wherein the computer instructions for causing the computer to represent each identified rectangular area as a rule with a rule descriptor include computer instructions that, for each identified rectangular area, cause the computer to represent the rectangular area with location coordinates of image elements at two opposite corners of the rectangular area.

20. The computer storage medium of claim 4 wherein the computer instructions for causing the computer to represent each identified rectangular area as a rule with a rule descriptor include computer instructions that, for each identified rectangular area, cause the computer to represent the rectangular area with a height value, a width value, and location coordinates for an image element of the rectangular area.

21. The computer storage medium of claim 4 wherein the computer instructions for causing the computer to scan the bit-mapped image include computer instructions that cause the computer to identify a rectangular area only if the rectangular area has plural image elements vertically and plural image elements horizontally.

* * * * *